United States Patent
Eells

(10) Patent No.: US 10,571,982 B2
(45) Date of Patent: Feb. 25, 2020

(54) RESETTABLE WRITE ONCE READ MANY MEMORY

(71) Applicant: International Business Machines Corporation, Armonk, NY (US)

(72) Inventor: John Eells, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 15/819,204

(22) Filed: Nov. 21, 2017

(65) Prior Publication Data

US 2019/0155349 A1    May 23, 2019

(51) Int. Cl.
| | |
|---|---|
| *G06F 1/24* | (2006.01) |
| *G06F 12/02* | (2006.01) |
| *G06F 9/44* | (2018.01) |
| *G06F 9/4401* | (2018.01) |
| *G06F 8/65* | (2018.01) |

(52) U.S. Cl.
CPC ............... *G06F 1/24* (2013.01); *G06F 8/66* (2013.01); *G06F 9/4403* (2013.01); *G06F 9/4406* (2013.01); *G06F 12/023* (2013.01); *G06F 2212/1044* (2013.01)

(58) Field of Classification Search
CPC ..... G06F 9/4403; G06F 9/4406; G06F 12/023
USPC .......................................................... 711/155
See application file for complete search history.

(56) References Cited

U.S. PATENT DOCUMENTS

| | | | |
|---|---|---|---|
| 6,185,661 B1 * | 2/2001 | Ofek ..................... | G06F 3/0607 711/145 |
| 6,268,789 B1 | 7/2001 | Diamant et al. | |
| 6,377,526 B1 * | 4/2002 | Vining ................. | G11B 7/0055 369/275.3 |
| 8,719,923 B1 | 5/2014 | Miller et al. | |
| 9,158,699 B2 | 10/2015 | Pronovost et al. | |
| 2006/0227799 A1 | 10/2006 | Lee | |
| 2010/0017559 A1 * | 1/2010 | Fruin .................... | G06F 3/0607 711/103 |
| 2016/0188221 A1 | 6/2016 | Janik | |

FOREIGN PATENT DOCUMENTS

EP        2138946 A1    12/2009

OTHER PUBLICATIONS

R. Sion, et al.,"Fighting Mallory the Insider: Strong Write Once Read Many Storage Assurances", IEEE Transactions on Information Forensics and Security, Oct. 14, 2011, vol. 7, Issue 2, p. 1-31.

* cited by examiner

*Primary Examiner* — Tuan V Thai
*Assistant Examiner* — Edward Waddy, Jr.
(74) *Attorney, Agent, or Firm* — Cantor Colburn LLP; Steven Chiu

(57) ABSTRACT

Embodiments include method, systems and computer program products for operating a resettable write once read many (RWORM) memory. The method includes receiving, by a processor, a request for at least a portion of memory in a computer system to be designated as RWORM memory. The processor further writes data to the RWORM memory. The processor further maintains the RWORM memory in a read-only state after the RWORM memory is written to. The processor further re-designates the RWORM memory to a read/write state in response to encountering a system reset.

15 Claims, 3 Drawing Sheets

RESETTABLE WRITE ONCE READ MANY MEMORY

BACKGROUND

The present invention relates to user interaction within a programming environment for a computing device, and more specifically, to designating the portions of memory as read-only which can be reset to enable read and write operations.

Computer systems, processors, caches, I/O device and other devices in the computer architecture access data in memory using one or more memory controllers. The memory controllers manage the movement of data to and from memory, for example, a dynamic random access memory (DRAM).

Most general purpose computers utilize an operating system ("OS") as an interface between their applications and the computer hardware. As such, the OS usually manages data processing application programs executing on the computer as well as controlling the hardware resources responsive to the data application programs. A data processing application is an application that processes data. A user application may be a data processing application that processes data directly in support of one of the computer's users. A system application may be a data processing application processing data in support of one or more users or system applications running on the same or a remote system. System applications are typically implemented as a user-level application running with special privileges and commonly referred to as system daemons.

In addition, the portion of the OS that may control other portions of the OS is usually called the OS kernel. The OS kernel usually has complete access to the application address space and files.

SUMMARY

Embodiments of the invention are directed to a method for operating a resettable write once read many (RWORM) memory. A non-limiting example of the computer-implemented method includes receiving, by a processor, a request for at least a portion of memory in a computer system to be designated as RWORM memory. The processor further writes data to the RWORM memory. The processor further maintains the RWORM memory in a read-only state after the RWORM memory is written to. The processor further re-designates the RWORM memory to a read/write state in response to encountering a system reset.

Embodiments of the invention are directed to a computer program product that can include a storage medium readable by a processing circuit that can store instructions for execution by the processing circuit for performing a method for operating a resettable write once read many (RWORM) memory. A non-limiting example of the computer-implemented method includes receiving, by a processor, a request for at least a portion of memory in a computer system to be designated as RWORM memory. The processor further writes data to the RWORM memory. The processor further maintains the RWORM memory in a read-only state after the RWORM memory is written to. The processor further re-designates the RWORM memory to a read/write state in response to encountering a system reset.

Embodiments of the invention are directed to a system. The system can include a processor in communication with one or more types of memory. The processor can be configured to receive a request for at least a portion of memory in a computer system to be designated as RWORM memory. The processor can be further configured to write data to the RWORM memory. The processor can be further configured to maintain the RWORM memory in a read-only state after the RWORM memory is written to. The processor can be further configured to re-designate the RWORM memory to a read/write state in response to encountering a system reset.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
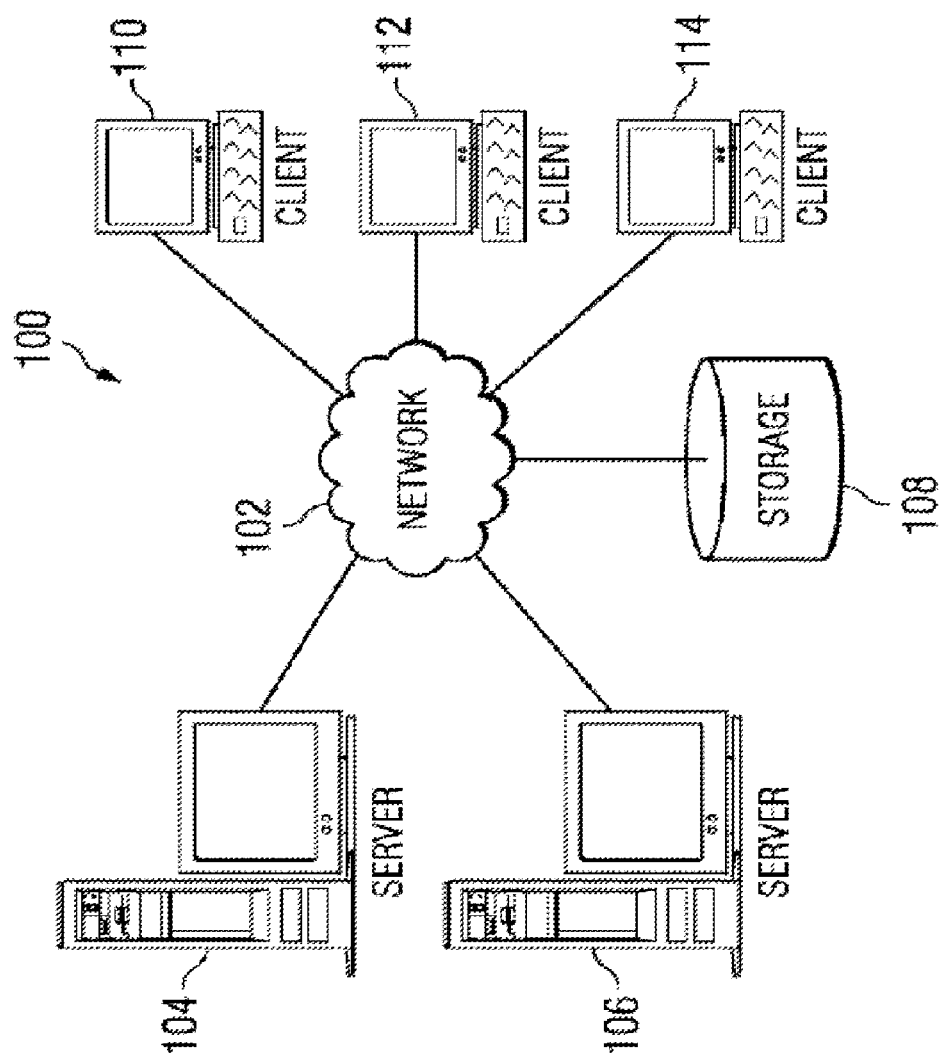
FIG. 1 is an exemplary diagram of a distributed data processing system in which exemplary aspects of the present invention may be implemented.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems and computer program products for operating a resettable write once read many (RWORM) memory is described herewith.

In general, in computer data processing environments, (from very small home computers to very large enterprise computers), programmers, given the right authorization can alter computer memory to suit the needs of a given program. In certain instances where programmers desire portions of memory to store data sets (e.g. data, program files, etc.) in a fixed manner, the programmer can utilize Write-Once Read Many (WORM) techniques to alter the computer memory. WORM techniques are typically employed using peripheral input/output (I/O) devices, which are used for archival purposes because the storage space (ex., tape) employed for storage using WORM techniques cannot be subsequently altered.

Other instances where WORM techniques could be useful are in memory for networked data processing systems. However, given that memory resources are usually limited, permanently designating a portion of memory as read-only can be problematic.

Accordingly, allowing programmers, through an authorized program, to designate portions of memory as WORM temporarily (resettable WORM (RWORM) memory) as a data processing system operates for the remaining time that an instance of the operating system software is running, and reset the designated RWORM memory to perform normal READ and WRITE operations when the operation of that instance of the operating system software is terminated would be beneficial. An event that can reset the designated RWORM memory back to normal operation can be a system reset, which terminates the operation of an operating system software interacting with the authorized program. This can be especially useful when multiple programmers are sharing memory resources through the use of one or more programs, where having the ability to prevent other programmers from altering a portion of memory is beneficial.

Turning now to an overview of aspects of the present invention, one or more embodiments of the invention provide methods, systems, structures and computer program products configured to operate a computer system using a resettable write once read-only memory (RWORM). The RWORM memory allows a write operation (WRITE ONCE) to be performed that sets aside (designated) one or more real memory areas where data is written. The designated memory areas set aside by the WRITE ONCE operate as read-only until a current instance of the operating system is terminated or reloaded (SYSTEM RESET). Accordingly, programmers can prevent designated portions of memory from being overwritten temporarily and reset the designated portions of memory as READ/WRITE when subsequent writes to the designated portions of memory are acceptable to the programmer.

With reference now to the figures, FIG. 1 depicts a pictorial representation of an exemplary distributed data processing system in which aspects of the illustrative embodiments of the present invention may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
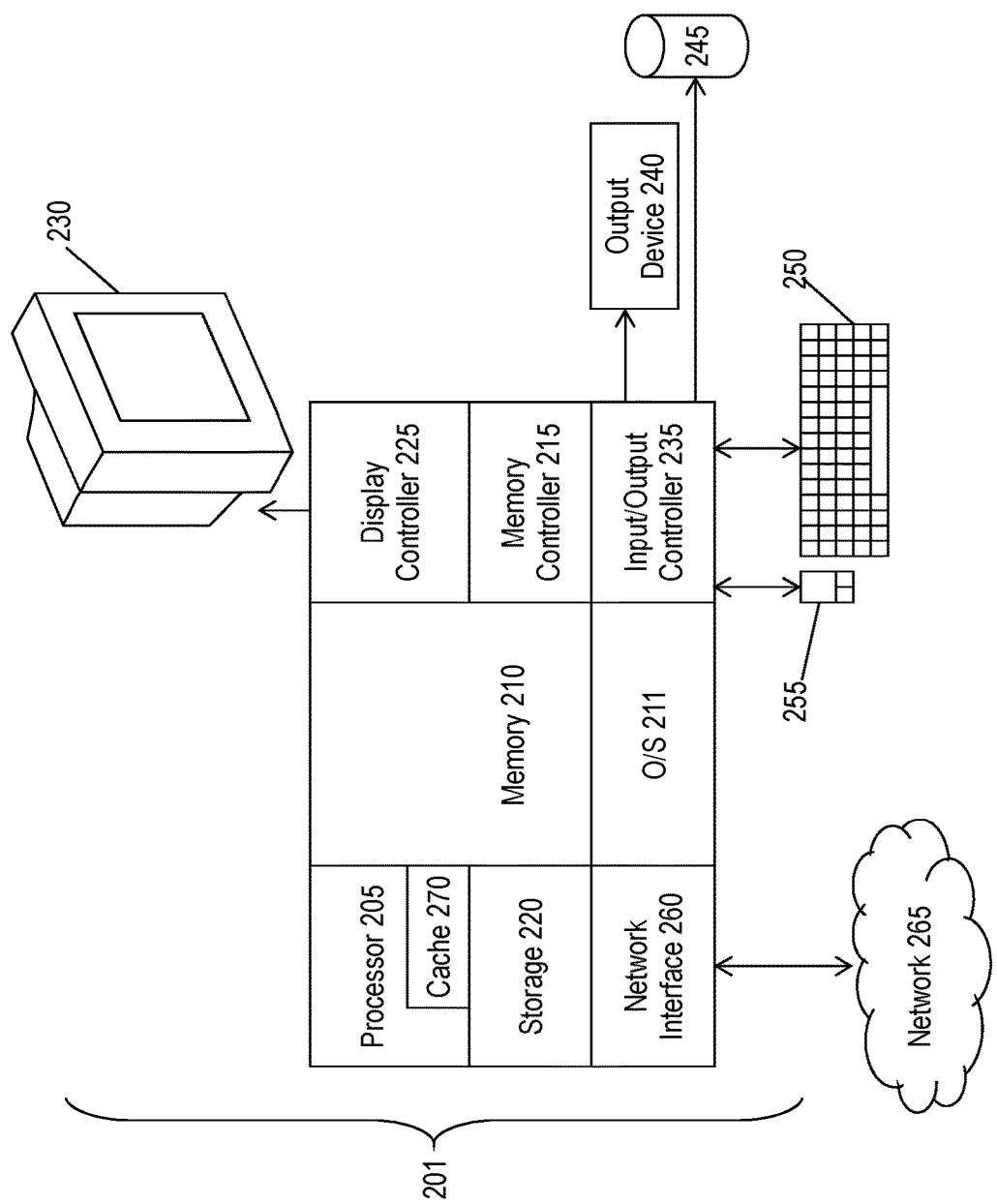
FIG. 2 is a block diagram illustrating one example of a processing system for practice of the teachings herein.

With reference now to FIG. 2, a block diagram of an exemplary data processing system 200 is shown in which aspects of the exemplary embodiments of the present invention may be implemented. Data processing system 200 is an example of a computer 201, such as server 104 or client 110 in FIG. 1, in which computer usable code or instructions implementing the processes for exemplary embodiments of the present invention may be located. Computer 201 includes a processor 205. The computer 201 further includes memory 210 coupled to a memory controller (MC) 215, and one or more input and/or output (I/O) devices 240, 245 (or peripherals) that are communicatively coupled via a local input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 205 is a hardware device for executing software, particularly that stored in storage 220, cache storage 270, or memory 210. The processor 205 can also execute software stored in registers that are located inside the processor 205 (not shown). Each register typically holds a word of data (often 32 or 64 bits). The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing instructions. The processor 205 can include one or more cores.

The memory 210 can include any one or combination of volatile memory elements (e.g., random access memory (RAM, such as DRAM, SRAM, SDRAM, etc.)) and non-volatile memory elements (e.g., ROM, erasable programmable read-only memory (EPROM), electronically erasable programmable read-only memory (EEPROM), programmable read-only memory (PROM), tape, compact disc read-only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another but can be accessed by the processor 205.

The instructions in memory 210 may include one or more separate programs, each of which comprises an ordered listing of executable instructions for implementing logical functions. The instructions in the memory 210 can be a part of a suitable operating system (OS) 211. The OS 211 essentially controls the execution of other computer programs and provides scheduling, input-output control, file and data management, memory management, and communication control and related services.

When acting as a memory manager, the OS 211 can request memory space allocations in the memory 210. The request can be for, for example, a deallocation of the memory space, a deallocation and an allocation of the memory space to the memory controller 215, or an allocation to the memory controller 215 of the memory space. The requested memory space may correspond with a buffer, a channel, a DRAM, a DIMM, a portion (sometimes referred to as a "chunk") of a bigger memory space, etc. The memory space may be a continuous memory space, a discontinuous memory space (e.g., a request for two gigabytes may result in two one-gigabyte memory spaces), etc. The request may be for a memory space to be used temporarily or a memory space to be used permanently. The request may seek a memory space corresponding to a region of memory 210 with a size, non-cacheable, with a pinned address virtual memory management attribute, or any combination thereof.

Moreover, the memory request may seek a general memory space, such as any memory space that may satisfy a requested quantity (e.g., any 4 k block or any physical address range of two gigabytes from the memory 210). On the other hand, the request may seek a specific memory space with a particular location (e.g., a specific physical address or addresses, specific physical address region, etc. from the memory 210). Alternatively, the request may seek a memory space with a particular attribute (e.g., a type, locality of reference, implied performance, speed, reliability, low power, non-volatility, etc.).

The cache 270 is a hardware device that stores data and is used by the processor 205 to reduce an average cost (time or energy) to access data from memory 210. The cache 270 is a smaller, faster memory that is located closer to one or more processor cores of the processor 205, which stores copies of the data from frequently used main memory locations.

The MC 215 is a hardware device for managing data traffic to and from memory 210. For example, the MC 215 can manage read and write operations to, for example, one or more DRAM components associated with the memory 210. The MC 215 may be able to communicate a request for a memory space of the memory 210 to the computer program, as well as initialize the memory 210 and perform operations on the memory 210 as instructed. The MC 215 may communicate with the computer program through a device driver of the MC 215 (not shown), and the computer program may run the device driver. The MC 215 may use the memory space in response to an indication from the computer program that the memory space is available. The computer program may be configured to make memory spaces of the memory available in response to requests for the memory spaces, such as requests for memory spaces from the MC 215.

In an exemplary embodiment, a conventional keyboard 250 and mouse 255 can be coupled to the input/output controller 235. Other output devices such as the I/O devices 240, 245 may include input devices, for example, but not limited to a printer, a scanner, microphone, and the like. Finally, the I/O devices 240, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 200 can further include a display controller 225 coupled to a display 230. In an exemplary embodiment, the system 200 can further include a network interface 260 for coupling to a network 265. The network 265 can be an IP-based network for communication between the computer 201 and any external server, client and the like via a broadband connection. The network 265 transmits and receives data between the computer 201 and external systems. In an exemplary embodiment, network 265 can be a managed IP network administered by a service provider. The network 265 may be implemented in a wireless fashion, e.g., using wireless protocols and technologies, such as WiFi, WiMax, etc. The network 265 can also be a packet-switched network such as a local area network, wide area network, metropolitan area network, Internet network, or another similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals. Other networks include body area networks (BAN) where the electric field of a human body can be used to transmit signals.

If the computer 201 is a PC, workstation, intelligent device or the like, the instructions in the memory 210 may further include a basic input output system (BIOS) (omitted for simplicity). The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to fetch and execute instructions stored within the memory 210, to communicate data to and from the memory 210 using the memory controller 215, and to generally control operations of the computer 201 pursuant to the instructions.

Figure 3:
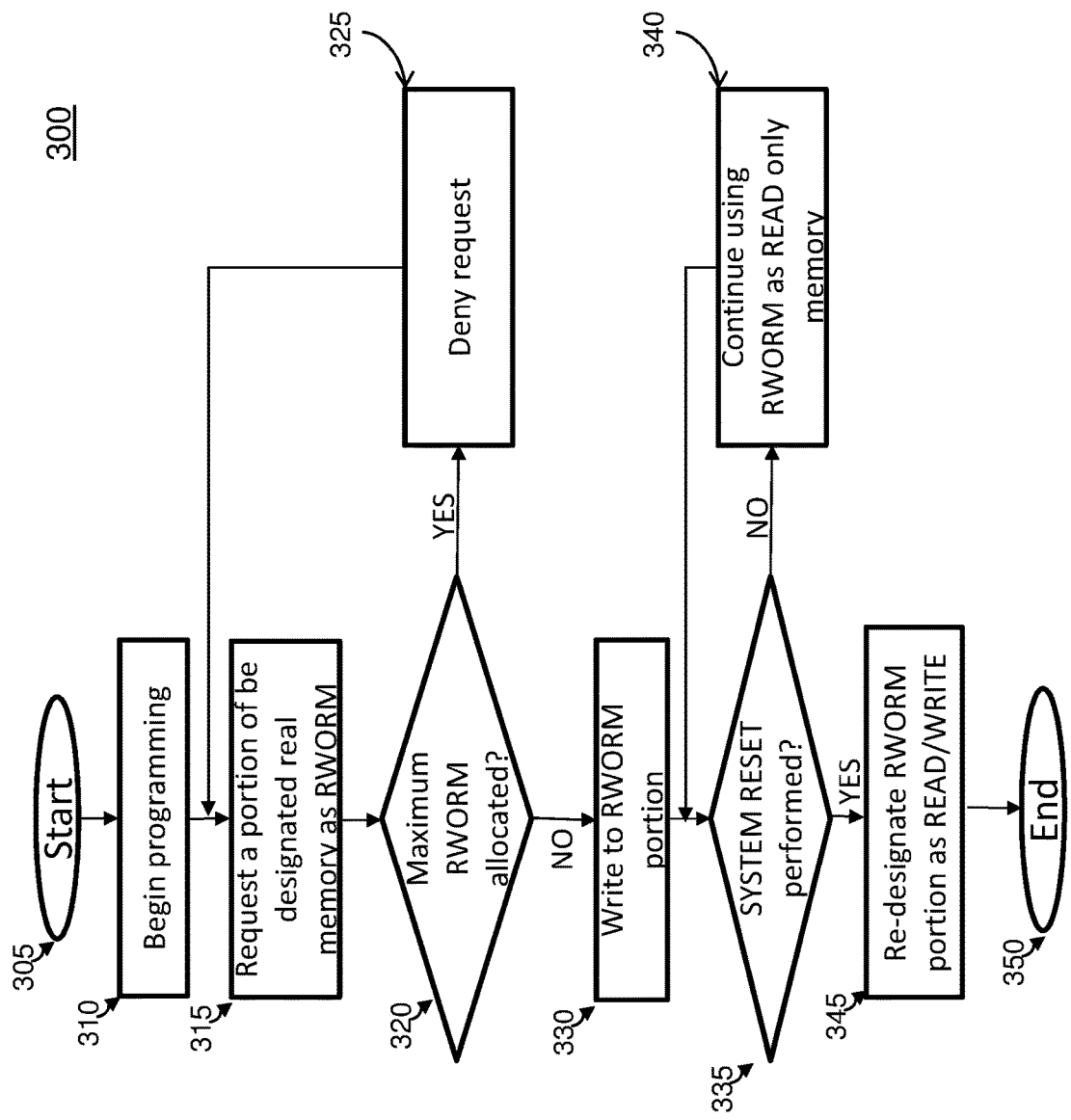
FIG. 3 is a flow diagram illustrating a method for operating a resettable write once read many (RWORM) memory according to one or more embodiments of the present invention; and The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

FIG. 3 is a flow diagram illustrating a computer-implemented method 300 of operating a resettable write once read many memory (RWORM) within a computer system according to one or more embodiments of the present invention. After starting at block 305, the computer-implemented method proceeds to block 310 where a programmer utilizes one or more commands of a computer program via a computer (ex., client 110) operating an operating system (OS), for example, OS 211.

At block 315, the programmer can request a memory space allocation and designate a portion of real memory (ex., memory 210) as RWORM memory. At block 320, method 300 can determine whether a specified maximum allocation of RWORM memory will be exceeded by the requested RWORM memory of block 315. If the maximum allocation of RWORM memory has been exceeded, method 300 proceeds to block 325 where the RWORM memory request at block 315 is denied and the process return to block 315. The denial of the RWORM memory request at block 325 can prevent a programming error or a malicious program from setting all available memory to as RWORM memory causing no memory to be available for continued system operation.

If the maximum allocation of RWORM memory has not been exceeded, method 300 proceeds to block 330 where the requested memory space is designated as RWORM memory and the programmer is allowed to write to RWORM memory. The RWORM memory will remain fixed, preventing the RWORM memory to be written to after the RWORM memory has been written to at block 330. Accordingly, the RWORM memory can be used as read-only memory (temporarily), accessible by other programmers and users to read data from the RWORM memory. The temporary status of the RWORM memory can be maintained using a set bit indicating that the RWORM memory has been written to and is now operating as read-only memory.

At block 335, method 300 can determine whether a system reset of the OS 211 has occurred. A RESET operation or a LOAD operation may cause a reset RWORM memory from read-only to read/write. If the method 300 does not encounter a system reset, the method 300 proceeds to block 340 where the RWORM memory will remain in use as read-only memory.

If the method 300 does encounter a system reset, the method 300 proceeds to block 345 where the RWORM memory is reset to once again function as READ/WRITE memory. Accordingly, an authorized program could designate an RWORM memory to remain in a read-only state until the system has been reset by a system reset operation. In addition, reloading the OS via a load operation also causes a system reset operation to be performed. At block 350, method 300 ends.

Using RWORM memory as described with regard to embodiments of the present invention has several benefits. For example, RWORM memory is not permanently fixed like WORM memory, larger or smaller areas of RWORM memory can be used for subsequent instantiations of an OS, and for the life of an operating system instance, the RWORM memory cannot be modified, either accidentally or deliberately.

Possible uses for RWORM memory can include hardening critical operating system programs so they cannot be overwritten, hardening pointers that persist for the life of an operating system instance so they cannot be overwritten and storing trusted copies of specific programs and data when useful.

Embodiments of the present invention that makes it possible to designate a memory area or areas as RWORM memory for the life of an operating system load (also known as "IPL" or "boot"). When a program authorized to store data into RWORM memory does so, the data is written into the specified real memory locations. The memory/storage controller will disallow any later attempt to modify those memory locations, but allow programs that are allowed to read them to retrieve the data from those locations.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a resettable write once read many (RWORM) memory, the method comprising:

receiving, by a processor, a request for at least a portion of memory in a computer system to be designated as RWORM memory;

determining whether the RWORM memory exceeds a maximum RWORM memory allocation for the memory, wherein the processor denies the request to designate at least a portion of memory as RWORM memory in response to a determination that the RWORM memory exceeds the maximum RWORM memory allocation for the memory;

in response to determining that the maximum RWORM memory allocation exceeds the RWORM memory, writing, by the processor, data to the RWORM memory, wherein the RWORM memory is not permanently fixed to an area of the memory;

maintaining, by the processor, the RWORM memory in a read-only state after the RWORM memory is written to; and re-designating, by the processor, the RWORM memory to a read/write state in response to encountering a system reset.

2. The computer-implemented method of claim 1, wherein the processor denies the request to designate at least a portion of memory as RWORM memory in response to a determination that the RWORM memory exceeds the maximum RWORM memory allocation for the memory.

3. The computer-implemented method of claim 1, wherein a system reset occurs in response to a reset operation or a load operation.

4. The computer-implemented method of claim 1, wherein one or more users employ one or more commands to interact with the RWORM memory.

5. The computer-implemented method of claim 1, wherein a set bit is used to indicate that the RWORM memory has been written to.

6. A computer program product for operating a resettable write once read many (RWORM) memory, the computer program product comprising:
    a computer readable storage medium having stored thereon first program instructions executable by a processor to cause the processor to:
        receive a request for at least a portion of memory in a computer system to be designated as RWORM memory;
        determine whether the RWORM memory exceeds a maximum RWORM memory allocation for the memory, wherein the processor denies the request to designate at least a portion of memory as RWORM memory in response to a determination that the RWORM memory exceeds the maximum RWORM memory allocation for the memory;
        in response to determining that the maximum RWORM memory allocation exceeds the RWORM memory, write, by the processor, data to the RWORM memory, wherein the RWORM memory is not permanently fixed to an area of the memory;
        maintain, by the processor, the RWORM memory in a read-only state after the RWORM memory is written to; and
        re-designate, by the processor, the RWORM memory to a read/write state in response to encountering a system reset.

7. The computer program product of claim 6, wherein the processor denies the request to designate at least a portion of memory as RWORM memory in response to a determination that the RWORM memory exceeds the maximum RWORM memory allocation for the memory.

8. The computer program product of claim 6, wherein a system reset occurs in response to a reset operation or a load operation.

9. The computer program product of claim 6, wherein one or more users employ one or more commands to interact with the RWORM memory.

10. The computer program product of claim 6, wherein a set bit is used to indicate that the RWORM memory has been written to.

11. A system, comprising:
    one or more processors; and
    at least one memory, the memory including instructions that, upon execution by at least one of the one or more processors, cause the system to perform a method for using a resettable write once read many (RWORM) memory, the method comprising:
        receiving a request for at least a portion of memory in a computer system to be designated as RWORM memory;
        determining whether the RWORM memory exceeds a maximum RWORM memory allocation for the memory, wherein the processor denies the request to designate at least a portion of memory as RWORM memory in response to a determination that the RWORM memory exceeds the maximum RWORM memory allocation for the memory;
        in response to determining that the maximum RWORM memory allocation exceeds the RWORM memory, writing data to the RWORM memory, wherein the RWORM memory is not permanently fixed to an area of the memory;
        maintaining the RWORM memory in a read-only state after the RWORM memory is written to; and
        re-designating the RWORM memory to a read/write state in response to encountering a system reset.

12. The system of claim 11, wherein the processor denies the request to designate at least a portion of memory as RWORM memory in response to a determination that the RWORM memory exceeds the maximum RWORM memory allocation for the memory.

13. The system of claim 11, wherein a system reset occurs in response to a reset operation or a load operation.

14. The system of claim 11, wherein one or more users employ one or more commands to interact with the RWORM memory.

15. The system of claim 11, wherein a set bit is used to indicate that the RWORM memory has been written to.

\* \* \* \* \*